Aug. 27, 1957 M. S. SASSO 2,804,104
PORTABLE MITERING GUIDE FOR POWER ROTARY SAW
Filed April 8, 1955 2 Sheets-Sheet 1
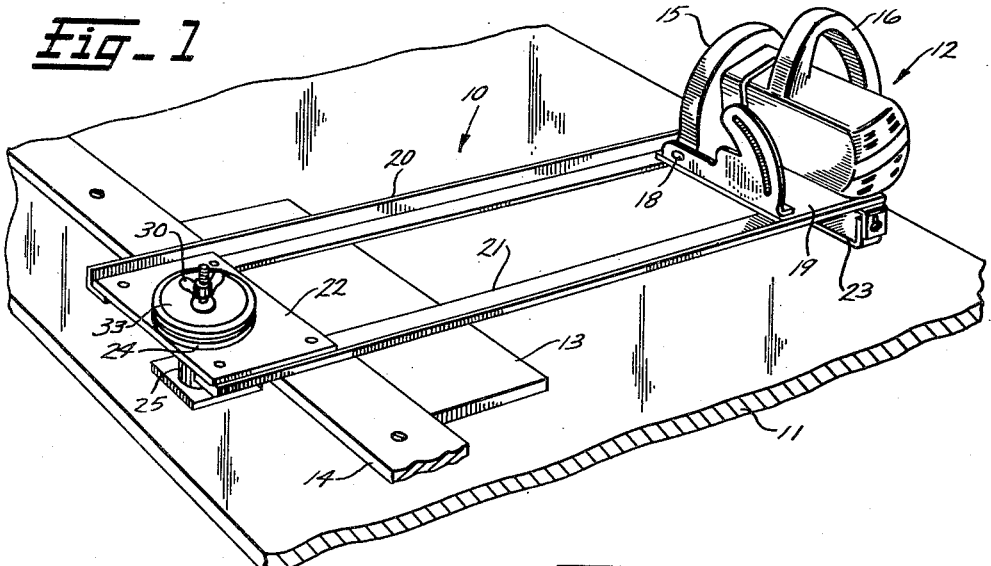
Fig_1
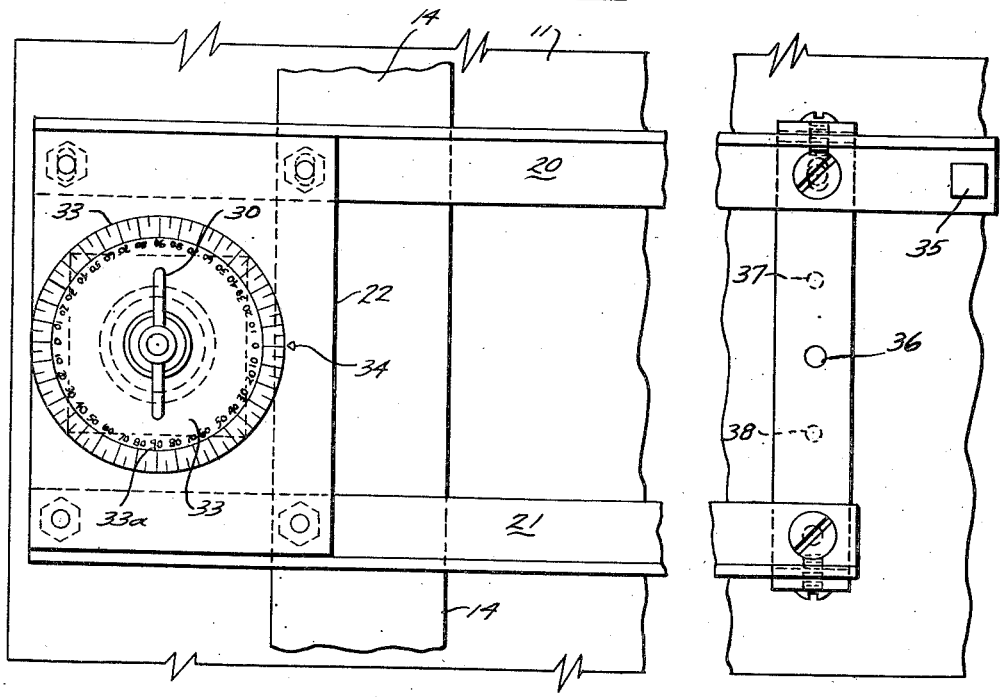
Fig_2
INVENTOR.
MARTIN S. SASSO
BY
H. G. Manning
ATTORNEY Aug. 27, 1957　　　　　M. S. SASSO　　　　　2,804,104
PORTABLE MITERING GUIDE FOR POWER ROTARY SAW
Filed April 8, 1955　　　　　　　　　　　2 Sheets-Sheet 2
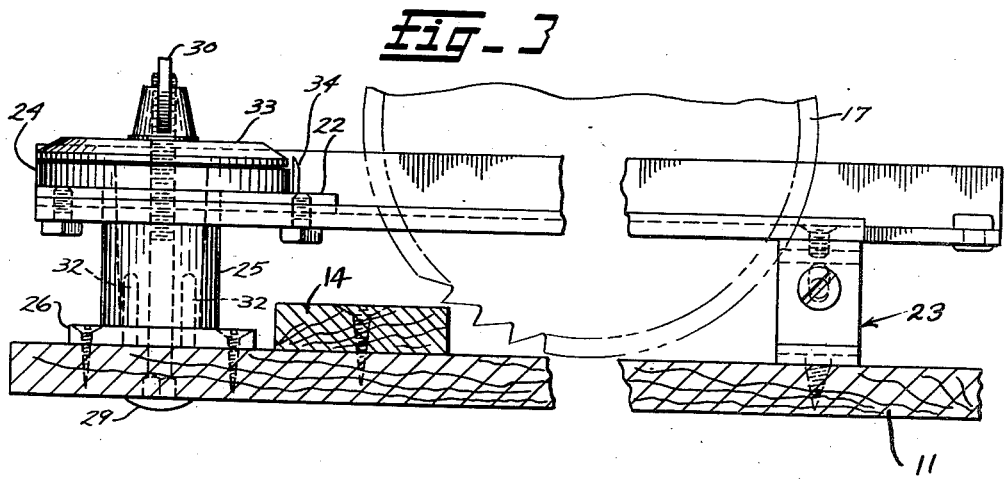
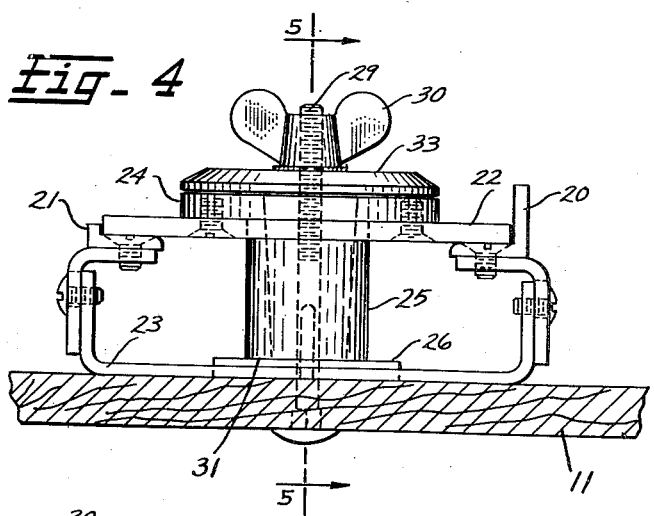
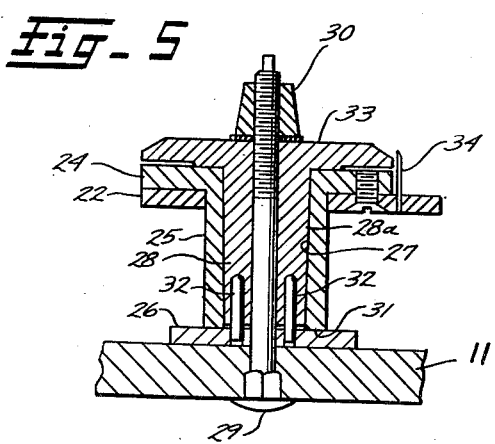
INVENTOR.
MARTIN S. SASSO
BY
H. G. Manning
ATTORNEY

United States Patent Office 2,804,104
Patented Aug. 27, 1957

2,804,104

PORTABLE MITERING GUIDE FOR POWER ROTARY SAW

Martin S. Sasso, Waterbury, Conn.

Application April 8, 1955, Serial No. 500,117

2 Claims. (Cl. 143—6)

This invention relates to woodworking machinery, and more particularly to a portable mitering guide for power rotary saws.

One object of this invention is to provide a portable mitering guide which can be adjusted to enable the user of a portable rotary saw to make repeated cuts in board material at a predetermined angle.

Another object is to provide a portable mitering guide for a power saw whereby the desired angle of cut for the saw can be quickly set, and readily changed, as desired.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawings, one form in which the invention may conveniently be embodied in practice.

In the drawings:

Fig. 1 represents a perspective view of a portable mitering guide attached to a table for use with a power rotary saw.

Fig. 2 is a top plan view, on an enlarged scale, of the mitering guide and saw table, with the center portion cut away.

Fig. 3 is a side view of the same, showing the position of the saw at the forward end of its forward movement in the mitering guide.

Fig. 4 is a front end view of the same, with the power saw removed.

Fig. 5 is a sectional view of the pivotal locking mechanism.

Referring now to the drawings, in which like reference numerals denote corresponding parts throughout the several views, the numeral 10 indicates generally a portable mitering guide which is adapted to be attached to the top of a baseboard or saw table 11 for the purpose of guiding a rotary power saw 12, to cut a board 13, which is positioned on the saw table 11 against a fence 14 attached to the front of said table.

The power saw 12, which is of conventional construction, and forms no part of the present invention, comprises a housing 15 provided with a handle 16 to enclose a saw blade 17, said housing being connected by a horizontal pivot 18 to a horizontal rectangular base 19.

The portable mitering guide 10 includes a pair of horizontal spaced-apart flanged strips or guides 20 and 21, which provide a slideway for the rectangular base 19 of the power saw 12. The strips 20 and 21 are connected at their forward ends to a rectangular plate 22, and at their rear ends are attached to a pair of vertical legs of a generally U-shaped transverse steady rest 23, the lower side of which is supported by the table 11.

The plate 22 is bolted, or otherwise secured to a horizontal flange 24 of a hollow column 25, the lower end of which column rests on a baseplate 26 which is adapted to be attached to the top of the saw table 11. The column 25 is also provided with a conically tapered interior bore 27 (Fig. 5), within which is a locking plug 28, provided with a matching conically tapered surface 28a. The locking plug 28 is centrally drilled to receive a carriage bolt 29 which projects upwardly through openings provided in the saw table 11 and the baseplate 26, and is retained in place by a threaded top wing nut 30.

It will be seen, therefore, that the locking plug 28 and the carriage bolt 29 provide a vertical pivot about which the column 25 with the associated guide strips 20 and 21 may be rotated as a unit, and that the baseplate 26 provides a bearing surface for the lower end 31 of the column 25.

In order to maintain the central locking plug 28 in a horizontally fixed position, one or more vertical pins 32 are slidably received in aligned recesses in the baseplate 26 and the locking plug 28.

The locking plug 28 is also provided at its upper end with a radially extending circular index flange 33 having a beveled periphery on which is a scale 33a (Fig. 2) for indicating, by means of a pointer 34 attached to the plate 22, the angular position of the guide strips 20 and 21 with respect to the fence 14.

It will also be understood that when the wing nut 30, bearing against the top of locking plug 28, is turned, to draw it downwardly on the bolt 29, the conical surface 28a will be urged into tight frictional engagement with the conical bore 27 of the column 25, whereby relative rotation of said column 25 with respect to the plug 28 will be effectively prevented. Consequently by virtue of the horizontally fixed positioning of the plug 28 with respect to the baseplate 26 and the table 11, by means of the indexing pins 32, the entire framework of the mitering guide, including the guide strips 20 and 21, will be locked as a unit in a fixed position, as determined by the location of the pointer 34 with reference to the scale 33a marked on the periphery of the index flange 33. A screw hole 36 is preferably employed in the center of the steady rest 23 for securing it rigidly to the table 11 when a large number of cuts are to be made at any particular angle.

*Operation*

In operation, the baseplate 26 will first be placed upon the saw table 11, forwardly of the fence 14, and with the remainder of the elements assembled as shown in Fig. 1, said baseplate 26 will be secured, as by screws or otherwise, in such a position that when the guide strips 20 and 21 are disposed at right angles to the fence 14, the pointer 34 will be at the zero position indicated by the scale 33a on the flange 33. Thereafter, whenever it is desired to make right-angled cuts in the board 13, the wing nut 30 will be turned down to clamp the plug 28 in frictional locking engagement with the column 25. The power saw 12, supported in sliding engagement on guide strips 20 and 21 by means of its base 19, may then be moved manually by the handle 16, forwardly, to bring the rotary saw blade 17 into engagement with the material 13 to be cut. The forward movement of the power saw 12 will be limited by the plate 22.

After each cut, the saw 12 may be returned to the starting position as shown in Fig. 1, by sliding it rearwardly manually on its base 19 along the guide strips 20, 21. In order to prevent the saw 12 from being accidentally slid completely off the rear end of the mitering guide, a projecting stop 35 may be provided on the guide strip 20.

As long as it is desired to make right-angled cuts in the material 13, it will only be necessary to position such material against the fence 14 while the saw is in the starting position, and to slide the saw forwardly along the guide strips 20, 21. However, if it is desired to change the angle of the cut, it will only be necessary to release the tension of the wing nut 30, which will relieve the "clutching" engagement between the tapered surfaces 27 and 28, and permit horizontal swinging of the column 25 and the guide strips 20 and 21 as a unit, so that the pointer 34 may be located at the desired position. The mitering guide may then again be locked in place by tightening down the wing nut 30, after which the saw 12 may be manually reciprocated on the guide strips 20 and 21 to make the desired cuts in the material 13, as previously indicated.

If it is desired to employ a saw of larger diameter than the saw 17 herein disclosed, so as to cut thicker boards, it will only be necessary to insert shims (not shown), strips of wood, or other material, on the table, under the base plate 26 and the steady rest 23. A pair of screw holes 37, 38, in the outer part of the steady rest 23 permit it to be secured to its shim.

While there has been disclosed in the specification, one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In a portable mitering guide for a power rotary saw, the combination including, a pair of saw guides having a downwardly extending steady rest at one end, and an internally conically tapered vertical column at the other end to support the guides above a saw table, a base member adapted to be attached to the table to provide a bearing surface for the lower end of said column, a vertical pivot pin, a tapered locking element axially slidable on said pivot pin to be received in the bore of said column, means to limit rotation of the locking element with respect to the base member, and adjustable means to exert axial force on the locking element for locking engagement of the column, in which said means for limiting the rotation of the locking element with respect to the base member comprises a vertical pin slidably received in aligned recesses in said base member and said locking element.

2. In a portable mitering guide for a power rotary saw, the combination including, a pair of saw guides having a downwardly extending steady rest at one end, and an internally conically tapered vertical column at the other end to support the guides above a saw table, a base member adapted to be attached to the table to provide a bearing surface for the lower end of said column, a vertical pivot pin, a tapered locking element axially slidable on said pivot pin to be received in the bore of said column, means to limit rotation of the locking element with respect to the base member, and adjustable means to exert axial force on the locking element for locking engagement of the column, said vertical pivot pin comprising a headed bolt extending upwardly through an opening provided in said base member, said adjustable means to exert axial force on the locking element comprising a nut threaded on the upper end of the said bolt, and said means to limit rotation of the locking element with respect to the base member comprising a vertical pin slidably received in aligned recesses in said base member and said locking element.

References Cited in the file of this patent

UNITED STATES PATENTS

| 1,683,460 | Hartway | Sept. 4, 1928 |
| 2,630,146 | Van Tuyl | Mar. 3, 1953 |
| 2,630,147 | Garberg | Mar. 3, 1953 |